(12) United States Patent
Inakoshi

(10) Patent No.: US 11,138,283 B2
(45) Date of Patent: Oct. 5, 2021

(54) DEVICE AND METHOD FOR AREA GENERATION

(71) Applicant: FUJITSU LIMITED, Kawasaki (JP)

(72) Inventor: Hiroya Inakoshi, Tama (JP)

(73) Assignee: FUJITSU LIMITED, Kawasaki (JP)

( * ) Notice: Subject to any disclaimer, the term of this patent is extended or adjusted under 35 U.S.C. 154(b) by 196 days.

(21) Appl. No.: 16/390,254

(22) Filed: Apr. 22, 2019

(65) Prior Publication Data

US 2019/0332638 A1 Oct. 31, 2019

(30) Foreign Application Priority Data

Apr. 27, 2018 (JP) .............................. JP2018-086483

(51) Int. Cl.
*G06F 16/9538* (2019.01)
*G06F 16/909* (2019.01)
*G06F 16/951* (2019.01)

(52) U.S. Cl.
CPC ........ *G06F 16/9538* (2019.01); *G06F 16/909* (2019.01); *G06F 16/951* (2019.01)

(58) Field of Classification Search
CPC ... G06F 16/909; G06F 16/951; G06F 16/9538
See application file for complete search history.

(56) References Cited

U.S. PATENT DOCUMENTS

| | | | | |
|---|---|---|---|---|
| 8,571,278 B2 * | 10/2013 | Sonka | ....................... | G06T 7/11 382/128 |
| 2011/0283205 A1 | 11/2011 | Nie et al. | | |
| 2013/0185238 A1 | 7/2013 | Morikawa et al. | | |

FOREIGN PATENT DOCUMENTS

| | | |
|---|---|---|
| JP | 2013-148684 | 8/2013 |
| JP | 2013-532321 | 8/2013 |
| JP | 2017-102540 | 6/2017 |

(Continued)

OTHER PUBLICATIONS

Takeshi Fukuda et al., "Data Mining Using Two-Dimensional Optimized Association Rules: Scheme, Algorithms, and Visualization", Proc. of the 1996 ACM SIGMOD International Conference on Management of Data, pp. 13-23, Jun. 4, 1996 (11 pages).

(Continued)

*Primary Examiner* — Scott A. Waldron
(74) *Attorney, Agent, or Firm* — Fujitsu Patent Center

(57) ABSTRACT

A storage medium storing a program that causes a processor to execute for acquiring distribution data indicating a distribution of spots in an area to be searched, and area data indicating positions of divided areas obtained by dividing the area to be searched; generating an adjacency matrix indicating an adjacency relation between the divided areas from the area data; generating an evaluation function for evaluating selection of the divided areas using: a variable indicating selection of consecutive divided areas, the distribution data, and the adjacency matrix; calculating a gradient of a value of the evaluation function from a current value of the variable; executing a gradient method search for updating the value of the variable using the calculated gradient; and determining selection of the divided areas as an optimal area for event occurrence analysis based on a result of the gradient method search.

10 Claims, 12 Drawing Sheets

(56) References Cited

FOREIGN PATENT DOCUMENTS

WO   2011/143154   11/2011
WO   2013/061464    5/2013

OTHER PUBLICATIONS

Rajeev Rastogi et al., "Mining Optimized Association Rules with Categorical and Numeric Attributes", IEEE Transactions on Knowledge and Data Engineering, vol. 14 No. 1, pp. 29-50, Aug. 7, 2002 (22 pages).

Toshiro Tango et al., "A flexibly shaped spatial scan statistic for detecting clusters", International Journal of Health Geographies 2005, pp. 1-15, May 18, 2005 (15 pages).

Hiroya Inakoshi et al., "Discovery of Areas with Locally Maximal Confidence from Location Data", Proc. of the 19th International Conference on Database Systems for Advanced Applications (DASFAA), pp. 47-61, Apr. 21, 2014 (15 pages).

\* cited by examiner

RELATED ART

RELATED ART

FIG. 7A
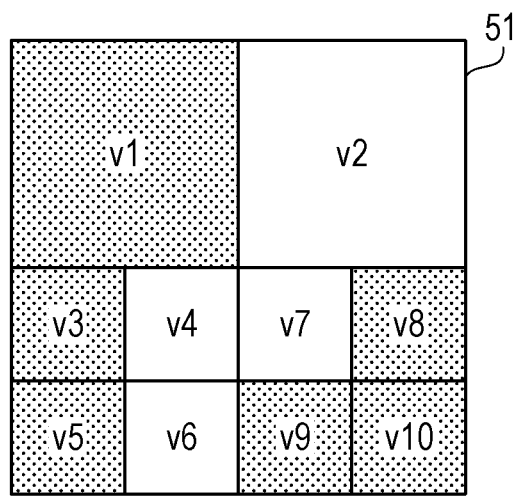
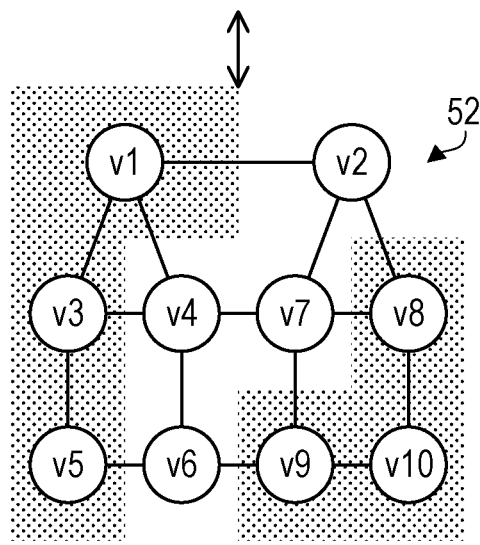
FIG. 7B
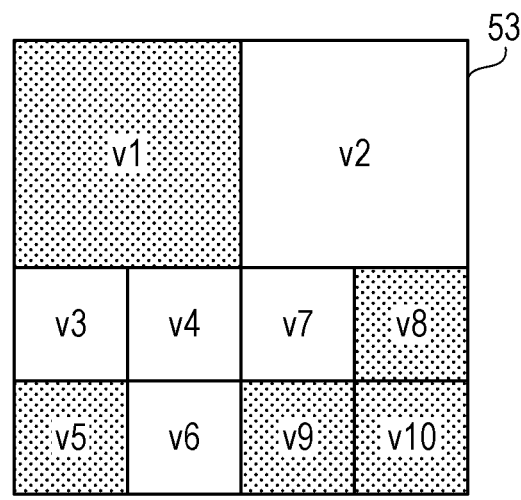
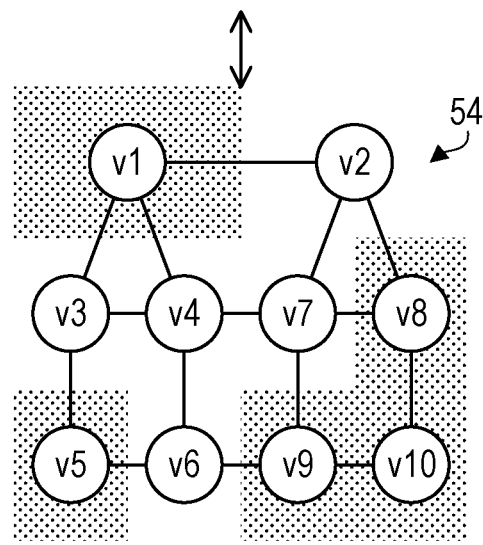

FIG. 8

$$W = \begin{pmatrix} 0 & 1 & 1 & 1 & 0 & 0 & 0 & 0 & 0 & 0 & 0 \\ 1 & 0 & 0 & 0 & 0 & 0 & 1 & 1 & 1 & 0 & 0 \\ 1 & 0 & 0 & 1 & 1 & 0 & 0 & 0 & 0 & 0 & 0 \\ 1 & 0 & 1 & 0 & 0 & 1 & 1 & 0 & 0 & 0 & 0 \\ 0 & 0 & 1 & 0 & 0 & 1 & 0 & 0 & 0 & 0 & 0 \\ 0 & 0 & 0 & 1 & 1 & 0 & 0 & 0 & 0 & 1 & 0 \\ 0 & 1 & 0 & 1 & 0 & 0 & 0 & 1 & 1 & 1 & 0 \\ 0 & 1 & 0 & 0 & 0 & 0 & 1 & 0 & 0 & 0 & 1 \\ 0 & 0 & 0 & 0 & 0 & 1 & 1 & 0 & 0 & 0 & 1 \\ 0 & 0 & 0 & 0 & 0 & 0 & 0 & 1 & 1 & 1 & 0 \end{pmatrix} \Big\} 131$$

FIG. 9

| v10 | v11 | v12 | v1 |
|-----|-----|-----|-----|
| v9 | v0 | | v2 |
| v8 | | | v3 |
| v7 | v6 | v5 | v4 |

$$W = \begin{pmatrix}
0 & 0 & 1 & 1 & 0 & 1 & 1 & 0 & 1 & 1 & 0 & 1 & 1 \\
0 & 0 & 1 & 1 & 0 & 0 & 0 & 0 & 0 & 0 & 0 & 0 & 1 \\
1 & 1 & 0 & 0 & 0 & 0 & 0 & 0 & 0 & 0 & 0 & 0 & 0 \\
1 & 0 & 1 & 1 & 1 & 0 & 0 & 0 & 0 & 0 & 0 & 0 & 0 \\
0 & 0 & 0 & 0 & 0 & 1 & 0 & 0 & 0 & 0 & 0 & 0 & 0 \\
1 & 0 & 0 & 0 & 1 & 0 & 1 & 0 & 0 & 0 & 0 & 0 & 0 \\
1 & 0 & 0 & 0 & 0 & 1 & 0 & 1 & 0 & 0 & 0 & 0 & 0 \\
0 & 0 & 0 & 0 & 0 & 0 & 1 & 0 & 1 & 0 & 0 & 0 & 0 \\
1 & 0 & 0 & 0 & 0 & 0 & 0 & 1 & 0 & 1 & 0 & 0 & 0 \\
1 & 0 & 0 & 0 & 0 & 0 & 0 & 0 & 1 & 0 & 1 & 0 & 0 \\
0 & 0 & 0 & 0 & 0 & 0 & 0 & 0 & 0 & 1 & 0 & 1 & 0 \\
1 & 0 & 0 & 0 & 0 & 0 & 0 & 0 & 0 & 0 & 1 & 0 & 1 \\
1 & 1 & 0 & 0 & 0 & 0 & 0 & 0 & 0 & 0 & 0 & 1 & 0
\end{pmatrix} \quad 132$$

$$U = \begin{pmatrix}
0 & 1 & 0 & 0 & 1 & 0 & 0 & 1 & 0 & 0 & 1 & 0 & 0 \\
1 & 0 & 0 & 0 & 0 & 0 & 0 & 0 & 0 & 0 & 0 & 0 & 0 \\
1 & 0 & 0 & 0 & 0 & 0 & 0 & 0 & 0 & 0 & 0 & 0 & 1 \\
1 & 0 & 0 & 0 & 0 & 1 & 0 & 0 & 0 & 0 & 0 & 0 & 0 \\
1 & 0 & 0 & 0 & 0 & 0 & 0 & 0 & 0 & 0 & 0 & 0 & 0 \\
1 & 0 & 0 & 1 & 0 & 0 & 0 & 0 & 0 & 0 & 0 & 0 & 0 \\
1 & 0 & 0 & 0 & 0 & 0 & 0 & 0 & 1 & 0 & 0 & 0 & 0 \\
1 & 0 & 0 & 0 & 0 & 0 & 0 & 0 & 0 & 0 & 0 & 0 & 0 \\
1 & 0 & 0 & 0 & 0 & 0 & 1 & 0 & 0 & 0 & 0 & 0 & 0 \\
1 & 0 & 0 & 0 & 0 & 0 & 0 & 0 & 0 & 0 & 0 & 1 & 0 \\
1 & 0 & 0 & 0 & 0 & 0 & 0 & 0 & 0 & 0 & 0 & 0 & 0 \\
1 & 0 & 0 & 0 & 0 & 0 & 0 & 0 & 0 & 1 & 0 & 0 & 0 \\
1 & 0 & 1 & 0 & 0 & 0 & 0 & 0 & 0 & 0 & 0 & 0 & 0
\end{pmatrix} \quad 133$$

$$Q = \begin{pmatrix}
0 & 1 & 0 & 0 & 1 & 0 & 0 & 1 & 0 & 0 & 1 & 0 & 0 \\
1 & 0 & 0 & 0 & 0 & 0 & 0 & 0 & 0 & 0 & 0 & 0 & 0 \\
0 & 0 & 0 & 0 & 0 & 0 & 0 & 0 & 0 & 0 & 0 & 0 & 1 \\
0 & 0 & 0 & 0 & 0 & 1 & 0 & 0 & 0 & 0 & 0 & 0 & 0 \\
1 & 0 & 0 & 0 & 0 & 0 & 0 & 0 & 0 & 0 & 0 & 0 & 0 \\
0 & 0 & 0 & 1 & 0 & 0 & 0 & 0 & 0 & 0 & 0 & 0 & 0 \\
0 & 0 & 0 & 0 & 0 & 0 & 0 & 0 & 1 & 0 & 0 & 0 & 0 \\
1 & 0 & 0 & 0 & 0 & 0 & 0 & 0 & 0 & 0 & 0 & 0 & 0 \\
0 & 0 & 0 & 0 & 0 & 0 & 1 & 0 & 0 & 0 & 0 & 0 & 0 \\
0 & 0 & 0 & 0 & 0 & 0 & 0 & 0 & 0 & 0 & 0 & 1 & 0 \\
1 & 0 & 0 & 0 & 0 & 0 & 0 & 0 & 0 & 0 & 0 & 0 & 0 \\
0 & 0 & 0 & 0 & 0 & 0 & 0 & 0 & 0 & 1 & 0 & 0 & 0 \\
0 & 0 & 1 & 0 & 0 & 0 & 0 & 0 & 0 & 0 & 0 & 0 & 0
\end{pmatrix} \quad 134$$

DEVICE AND METHOD FOR AREA GENERATION

CROSS-REFERENCE TO RELATED APPLICATION

This application is based upon and claims the benefit of priority of the prior Japanese Patent Application No. 2018-86483, filed on Apr. 27, 2018, the entire contents of which are incorporated herein by reference.

FIELD

The embodiments discussed herein are related to a computer-readable storage medium storing a program, a device, and a method.

BACKGROUND

It may be desirable to extract and visualize, from the distribution of spots indicating the place where a certain kind of event occurred, an area where the certain kind of event occurs more densely than other areas. For example, it is conceivable to extract an area with a large number of patients with particular diseases from the map, which is the two-dimensional plane, or to extract an area where a specific type of vehicle is traveling in large number, and the like.

For example, a technique of extracting, as a set of meshes where an area to be searched is divided into square meshes of uniform size, and spots are densely arranged, one polygon called an Admissible Region which is a shape obtained by connecting two or more rectangles in the horizontal direction has been offered. For example, a technique of extracting one rectangle surrounding a set of closely spaced spots from the area to be searched has been offered. For example, a technique of generating a graph indicating the adjacency relation between a plurality of administrative districts described on the map, extracting a subgraph that fits into a circle of a predetermined size from the graph, and extracting two or more consecutive administrative districts by comprehensively evaluating the extracted subgraph has been offered. For example, a technique of extracting one or more optimal areas composed of two or more consecutive meshes by dividing the area to be searched into square meshes of non-uniform size according to the distribution of spots and excluding unnecessary meshes in order has been offered.

Mining devices that analyze Web pages to determine the connection with people, and generate social networking graphs have been offered. Optimal area extraction devices that extract a combination of unit areas having the maximum gain from a set of unit areas divided by multi-dimensional numerical data have been offered. Classifiers that learn a score function that classifies data into classes from the sample of the positive example class and the sample of the negative example class have been offered.

Examples of the related art include International Publication Pamphlet No. 2011/143154, International Publication Pamphlet No. 2013/061464, Japanese Laid-open Patent Publication No. 2013-148684, and Japanese Laid-open Patent Publication No. 2017-102540.

SUMMARY

According to an aspect of the embodiments, a non-transitory computer-readable storage medium storing a program that causes a processor to execute for acquiring distribution data indicating a distribution of spots in an area to be searched, and area data indicating positions of a plurality of divided areas obtained by dividing the area to be searched; generating an adjacency matrix indicating an adjacency relation between the plurality of divided areas from the area data; generating an evaluation function for evaluating selection of two or more of the plurality of divided areas using: a) a variable indicating selection of two or more consecutive divided areas, b) the distribution data, and c) the adjacency matrix; calculating a gradient of a value of the evaluation function from a current value of the variable; executing a gradient method search for updating the value of the variable using the calculated gradient; and determining selection of the two or more divided areas as an optimal area for event occurrence analysis based on a result of the gradient method search.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIGS. 7A and 7B are diagrams illustrating an example of the relation between area extraction and penalty;

FIG. 8 is a diagram illustrating an example of an adjacency matrix;

FIG. 9 is a diagram illustrating an example of another mesh;

FIG. 10 is a diagram illustrating an example of other adjacency matrixes;

DESCRIPTION OF EMBODIMENTS

When strictly limiting the shape and size of the area to be extracted as given conditions as described in Takeshi Fukuda, Yasuhiko Morimoto, Shinichi Morishita and Takeshi Tokuyama, "Data Mining Using Two-Dimensional Optimized Association Rules: Scheme, Algorithms, and Visualization", Proc. of the 1996 ACM SIGMOD International Conference on Management of Data, pp. 13-23, 4 Jun. 1996, Rajeev Rastogi and Kyuseok Shim, "Mining Optimized Association Rules with Categorical and Numeric Attributes", IEEE Transactions on Knowledge and Data Engineering, Volume 14 Issue 1, pp. 29-50, 7 Aug. 2002, and Toshiro Tango and Kunihiko Takahashi, "A flexibly shaped spatial scan statistic for detecting clusters", International Journal of Health Geographics 2005, 18 May 2005, an appropriate area matching the distribution of spots may not be extracted. On the other hand, in a case where the shape of the area to be extracted is not limited as in Hiroya Inakoshi, Hiroaki Morikawa, Tatsuya Asai, Nobuhiro Yugami and Seishi Okamoto, "Discovery of Areas with Locally Maximal Confidence from Location Data", Proc. of the 19th International Conference on Database Systems for Advanced Applications (DASFAA), pp. 47-61, 21 Apr. 2014, an area with an excessively complicated shape such as a polygon with too many corners may be extracted. In this regard, the spread of actual events such as epidemics of diseases represents often a gentle shape such as circle or ellipse. For this reason, an area with an excessively complicated shape does not properly represent an actual event and is unnatural.

Hereinafter, the present embodiment will be described with reference to the drawings.

First Embodiment

A first embodiment will be described.

Figure 1:
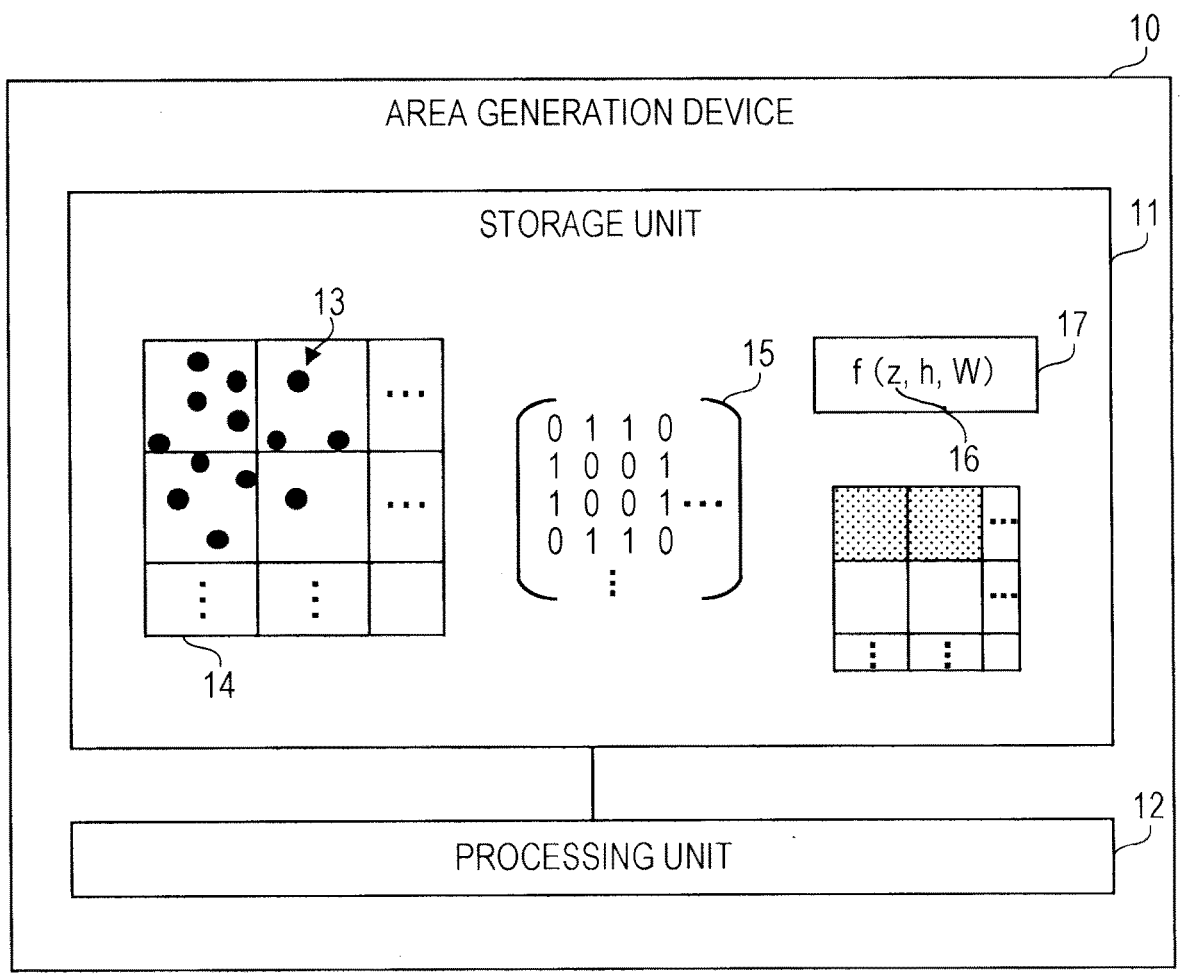
FIG. 1 is a diagram illustrating an example of an area generation device according to a first embodiment.

FIG. 1 is a diagram illustrating an example of an area generation device according to a first embodiment.

An area generation device 10 according to the first embodiment extracts a partial area in which spots are densely arranged from the area to be searched when the spots are unevenly distributed in the area to be searched which is a two-dimensional plane.

The area to be searched indicates, for example, a map of a country or an administrative district. A spot indicates, for example, a position where a specific type of event has occurred. The specific type of event includes, for example, an event in which a patient with a specific disease was discovered, a specific type of vehicle is traveling, or users of specific services are present. The area generation device 10 may be used in various scientific and technical fields such as spatial epidemiology, metrology geology, geostatistics, traffic analysis, weather analysis, topology, geometry and the like.

The area generation device 10 may be referred to as a computer or an information processing device. The area generation device 10 may be a client device operated by a user, or a server device that communicates with another device such as a client device via a network.

The area generation device 10 includes a storage unit 11 and a processing unit 12. The storage unit 11 may be a volatile semiconductor memory such as a random access memory (RAM), or a nonvolatile storage such as a hard disk drive (HDD) or a flash memory. The processing unit 12 is, for example, a processor such as a central processing unit (CPU) or a digital signal processor (DSP). However, the processing unit 12 may include specific-purpose electronic circuits such as an application specific integrated circuit (ASIC) and a field programmable gate array (FPGA). The processor executes a program stored in a memory (which may be the storage unit 11) such as a RAM. The program includes an area generation program. A set of plural processors may be referred to as "multiprocessor" or simply "processor".

The storage unit 11 stores distribution data 13 and area data 14.

The distribution data 13 illustrates the distribution of spots in the area to be searched (whole area). The distribution data 13 may be obtained by counting the number of spots belonging to the divided area for each divided area described below. Distribution data 13 may indicate the distribution of the reference group, and the distribution of the observation group which is a subset of the reference group and fits to a specific event. The distribution data 13 may be obtained by counting the number of spots (support) belonging to the reference group for each divided area and the number of spots belonging to the observation group (number of hits). For example, the population distribution corresponds to a distribution of the reference group, and the distribution of patients with specific diseases, the distribution of users of specific services, or the like corresponds to a distribution of the observation group.

The area data 14 indicates the positions of a plurality of divided areas generated by dividing the area to be searched. Each of the plurality of divided areas is preferably a rectangular area. Each of the plurality of divided areas may be expressed in a uniform sized mesh or a nonuniform sized mesh. The plurality of divided areas may be generated such that the number of spots included is substantially uniform. For example, the area to be searched is hierarchically divided so that the number of spots belonging to each divided area fall within a predetermined range. In this case, a place with many spots in the area to be searched is subdivided, and a place with few spots are not subdivided. Division of the area to be searched may be performed by the area generation device 10 or may be performed by another device.

The processing unit 12 generates, from the area data 14, an adjacency matrix 15 indicating the adjacency relation between the plurality of divided areas. The adjacency matrix 15 indicates, for example, an adjacency relation as to whether two divided areas which are rectangles share a side. However, the adjacency matrix 15 may indicate an adjacency relation as to whether two divided areas that are rectangles share a vertex. The processing unit 12 defines a variable 16 indicating a selection status for selecting two or more consecutive divided areas from the area to be searched. For example, the processing unit 12 allocates an individual variable indicating the selection status of the divided area to each divided area, and defines a vector of a plurality of individual variables as the variable 16. Two or more consecutive divided areas are a set of divided areas in which each divided area is directly or indirectly connected to all other divided areas, and may be represented as a coupled subgraph in a graph theory.

The processing unit 12 generates an evaluation function 17 using distribution data 13 ($h$), an adjacency matrix 15 ($W$), and a variable 16 ($z$). For example, the evaluation function 17 is f(z, h, W). The evaluation function 17 is a function for calculating an evaluation value evaluating the selection of the divided area indicated by the variable 16, and may also be said to be an objective function. The evaluation function 17 may include a first evaluation item and a second evaluation item, and the evaluation value calculated by the evaluation function 17 may be a combination of the evaluation based on the first evaluation item and the evaluation based on the second evaluation item.

The first evaluation item is an evaluation item for evaluating whether the two or more selected divided areas fit the distribution of spots using, for example, the distribution data 13 and the variable 16. The first evaluation item may also be referred to as a score function. The second evaluation item is an evaluation item for evaluating the shape (outer shape) of the two or more selected divided areas using, for example, the adjacency matrix 15 and the variable 16. The second evaluation item may also be called a regularization term. For example, the second evaluation item is set so that the more complex the shape of the two or more selected divided areas is, the lower the selection of the two or more divided areas is evaluated. The second evaluation item may be obtained by counting sides that the two or more selected divided areas share with other divided areas. In this case, the smaller the number of sides to be share, the higher the evaluation. The number of sides to be shared may be calculated using the value of the variable 16 and the adjacency matrix 15.

The processing unit 12 searches for the optimum value of the variable 16 by the gradient method search in accordance with the evaluation function 17. The processing unit 12 sets an initial value of the variable 16, calculates the gradient of the evaluation function 17 from the current value of the variable 16, and updates the value of the variable 16 using the calculated gradient. The processing unit 12 repeats the calculation of the gradient and the update of the value of the variable 16. In the gradient method search, for example, the variable 16 is updated in a direction so as to maximize the amount of change (inclination) of the evaluation value of the evaluation function 17 with respect to the minute change in the value of the variable 16. The processing unit 12 searches for the value of the variable 16 at which the evaluation function 17 is maximized.

Based on the result of the gradient method search, that is, based on the value of the variable 16 determined by the gradient method search, the processing unit 12 determines selection of the two or more consecutive divided areas from the area to be searched. The determined divided area may be referred to as an optimal area. The determined divided area is a place where spots are densely arranged in the area to be searched, and indicates that a specific type of event occurs more densely than that of other divided areas. The processing unit 12 may display the information indicating the determined divided area on a display connected to the area generation device 10. For example, the processing unit 12 displays a polygon surrounding the determined divided area on an area to be searched such as a map. The processing unit 12 may write information indicating the determined divided area in the storage device of the area generation device 10, or may transmit the information to another device via a network.

According to the area generation device 10 of the first embodiment, one spliced divided area with dense spots from the area to be searched where the spots are unevenly distributed is extracted and visualized. Therefore, it is easy to analyze the generation status of events such as spatial epidemiology and traffic analysis. Since selection of divided areas is evaluated using the evaluation function 17, it is not required to strictly limit the shape and size of the divided area to be extracted in advance. Therefore, the accuracy of the fitting with respect to the distribution of the input spots is improved. A regularization term for evaluating the shape of the divided area using the adjacency matrix 15 is added to the evaluation function 17. Therefore, it is possible to suppress the excessively complicated shape of the divided area to be extracted (increase in the number of irregularities), and it is possible to extract the divided area having a natural shape that properly expresses the generation status of the event. An optimal solution is searched for by the gradient method, so that it is not required to comprehensively evaluate combinations of various divided areas, whereby it is possible to reduce the amount of calculation.

Second Embodiment

Next, a second embodiment will be described.

The information processing device of the second embodiment extracts and visualizes the optimal area where a specific type of spot is densely arranged from the two-dimensional plane in which the spots are unevenly distributed. The information processing device may be used in various scientific and technical fields such as spatial epidemiology, metrology geology, geostatistics, traffic analysis, weather analysis, topology, geometry and the like. The information processing device may be a client device operated by a user, or a server device that communicates with another device such as a client device via a network.

Figure 2:
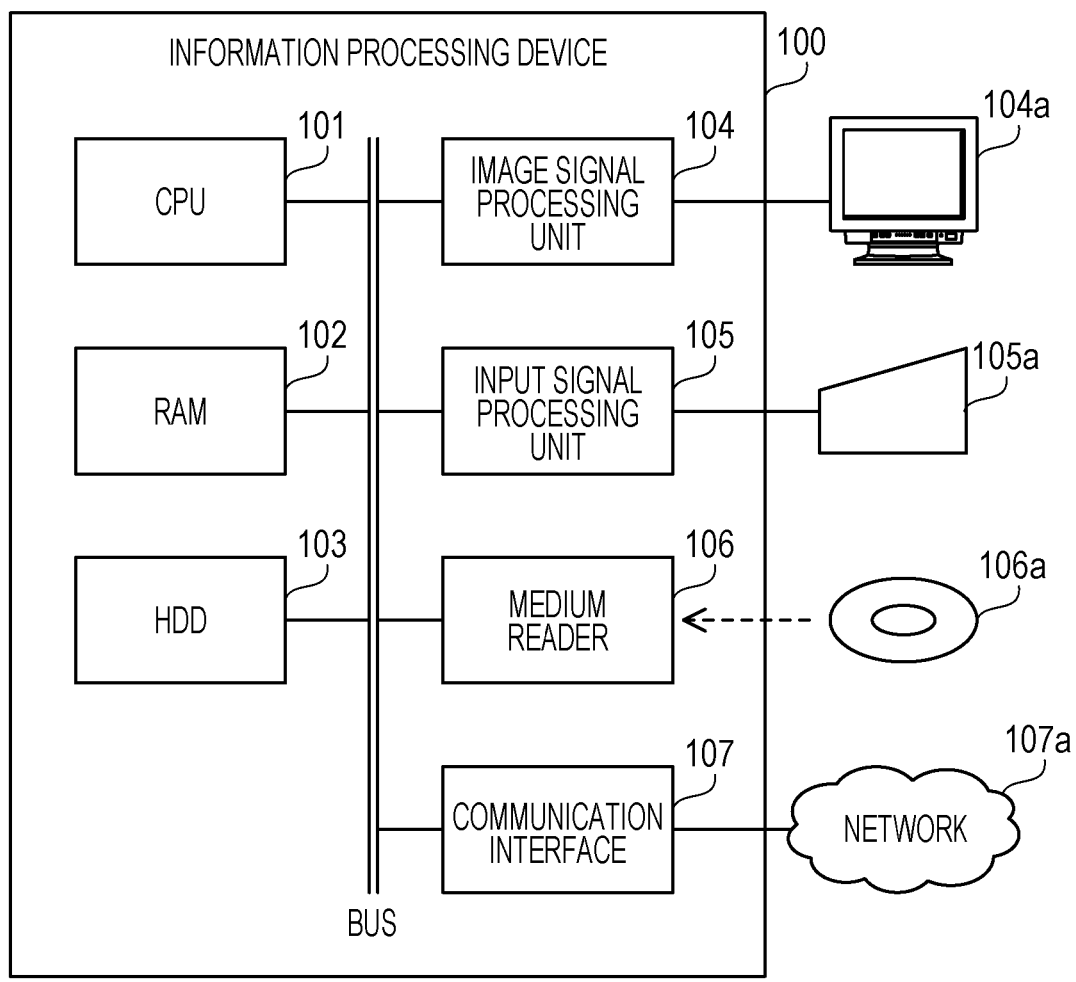
FIG. 2 is a block diagram illustrating an example of hardware of an information processing device.

FIG. 2 is a block diagram illustrating an example of hardware of the information processing device.

An information processing device 100 includes a CPU 101, a RAM 102, an HDD 103, an image signal processing unit 104, an input signal processing unit 105, a medium reader 106, and a communication interface 107. The units are connected to the bus. The information processing device 100 corresponds to the area generation device 10 of the first embodiment. The CPU 101 corresponds to the processing unit 12 of the first embodiment. The RAM 102 or the HDD 103 corresponds to the storage unit 11 of the first embodiment.

The CPU 101 is a processor that executes instructions of a program. The CPU 101 loads at least part of programs and data stored in the HDD 103 into the RAM 102, and executes the program. The CPU 101 may include a plurality of processor cores, and the information processing device 100 may include a plurality of processors. A set of plural processors may be referred to as "multiprocessor" or simply "processor".

The RAM 102 is a volatile semiconductor memory that temporarily stores programs executed by the CPU 101 and data used by the CPU 101 for calculation. The information processing device 100 may include a variety of memories other than the RAM, and may include a plurality of memories.

The HDD 103 is a nonvolatile storage device that stores software programs such as an operating system (OS), middleware, and application software, and data. The information processing device 100 may include other types of storage devices such as a flash memory and a solid state drive (SSD), and may include a plurality of storage devices.

The image signal processing unit 104 outputs an image to a display 104a connected to the information processing device 100 in accordance with a command from the CPU 101. The display 104a may include any type of displays such as a cathode ray tube (CRT) display, a liquid crystal display (LCD), and an organic electro-luminescence (OEL) display.

The input signal processing unit 105 receives an input signal from an input device 105a connected to the information processing device 100. The input device 105a may include any type of input devices such as a mouse, a touch panel, a touch pad, and a keyboard. Plural types of input devices may be connected to the information processing device 100.

The medium reader 106 is a reading device that reads a program and data recorded on a storage medium 106a. The storage medium 106a may include, for example, a magnetic disk such as a flexible disk (FD) or an HDD, an optical disc such as a compact disc (CD) or a digital versatile disc (DVD), a magneto-optical disk (MO), and a semiconductor memory. The medium reader 106 stores programs and data read from, for example, the storage medium 106a in the RAM 102 or the HDD 103.

The communication interface 107, which is connected to a network 107a, is an interface for communicating with another information processing device via the network 107a. The communication interface 107 may be a wired communication interface connected to a wired communication device such as a switch or a router, or a wireless communication interface connected to a base station or an access point.

Next, an algorithm for extracting the optimal area from the two-dimensional plane will be described. Spots belonging to the reference group, which is the mother group, are arranged on the two-dimensional plane. The reference group is classified into an observation group which is a set of spots corresponding to a specific event, and a set of other spots. In the drawings referred to in the second embodiment, spots belonging to the observation group may be represented by black spots, and spots not belonging to the observation group may be represented by white spots. The black spot indicates a place where a specific event has occurred such as a place where patients of a specific disease are present or a place where users of a specific service are present. The white spot indicates a place where no specific event has occurred such as a place where no patient of a specific disease is present or a place where no user of a specific service is present. The white spots may be placed at a density proportional to the population. The number of spots belonging to the reference group may be referred to as support, and the number of spots belonging to the observation group may be referred to as the number of hits.

The information processing device 100 extracts, from the two-dimensional plane as the optimal area, an area where spots (black spots) belonging to the observation group are dense. At this time, it is preferable to extract an area where the ratio of the observation group to the reference group is high. However, it is preferable that the area of the area to be extracted be not too small, and it is preferable that the number of spots of the reference group included in the area to be extracted be not too small. In this way, a featured area may be extracted from the two-dimensional plane.

Figure 3A:
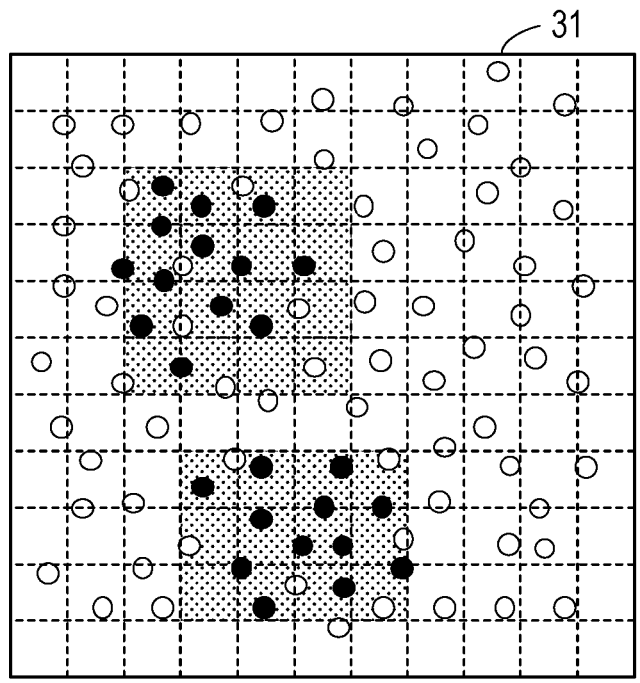
FIGS. 3A and 3B are diagrams illustrating a first extraction example of an optimal area in a related art.
Figure 3B:
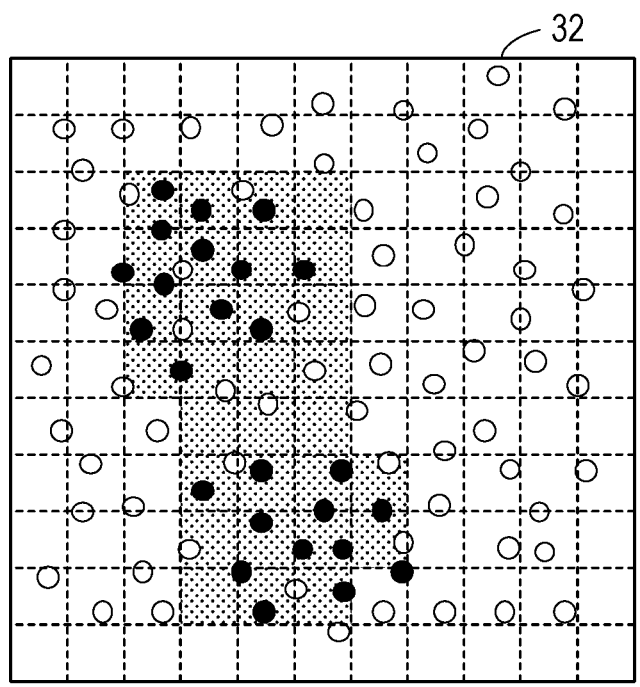

FIGS. 3A and 3B are diagrams illustrating a first extraction example of the optimal area.

A visualization screen 31 in FIG. 3A is a screen on which the distribution of spots and the optimal area on a two-dimensional plane are displayed. The visualization screen 31 illustrates the optimal area determined in accordance with the algorithm of Rajeev Rastogi and Kyuseok Shim, "Mining Optimized Association Rules with Categorical and Numeric Attributes", IEEE Transactions on Knowledge and Data Engineering, Volume 14 Issue 1, pp. 29-50, 7 Aug. 2002 mentioned above. This algorithm limits the shape of the optimal area to a rectangle. The visualization screen 31 indicates a cluster in which black spots are distributed circularly (isotropically) around a certain position, and another cluster in which black spots are distributed circularly around another position away from the certain position to some extent. As illustrated in the visualization screen 31, when the distribution of black spots in each cluster is isotropic, the algorithm of Rajeev Rastogi and Kyuseok Shim, "Mining Optimized Association Rules with Categorical and Numeric Attributes", IEEE Transactions on Knowledge and Data Engineering, Volume 14 Issue 1, pp. 29-50, 7 Aug. 2002 is expected to be able to extract the optimal area relatively satisfactorily.

A visualization screen 32 in FIG. 3B is a screen on which the distribution of spots and the optimal area on a two-dimensional plane are displayed. The visualization screen 32 illustrates the optimal area determined in accordance with the algorithm of Takeshi Fukuda, Yasuhiko Morimoto, Shinichi Morishita and Takeshi Tokuyama, "Data Mining Using Two-Dimensional Optimized Association Rules: Scheme, Algorithms, and Visualization", Proc. of the 1996 ACM SIGMOD International Conference on Management of Data, pp. 13-23, 4 Jun. 1996 mentioned above. This algorithm extracts a polygon called an Admissible Region, which is a shape obtained by connecting two or more rectangles in the horizontal direction. The visualization screen 32 illustrates the distribution same as the visualization screen 31. As illustrated in the visualization screen 32, when there is a plurality of clusters, the algorithm of Takeshi Fukuda, Yasuhiko Morimoto, Shinichi Morishita and Takeshi Tokuyama, "Data Mining Using Two-Dimensional Optimized Association Rules: Scheme, Algorithms, and Visualization", Proc. of the 1996 ACM SIGMOD International Conference on Management of Data, pp. 13-23, 4 Jun. 1996 may extract an Admissible Region connecting the plurality of clusters, so that the accuracy of the optimal area may decrease.

Figure 4A:
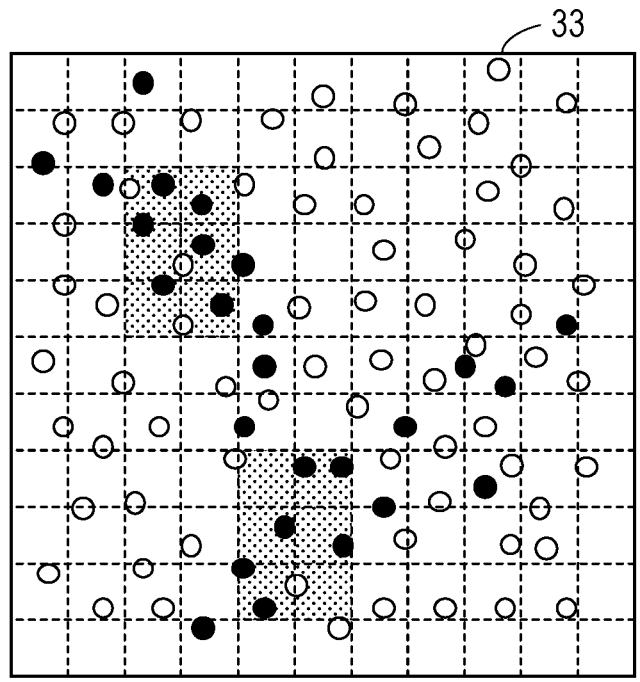
FIGS. 4A and 4B are diagrams illustrating a second extraction example of an optimal area in a related art.
Figure 4B:
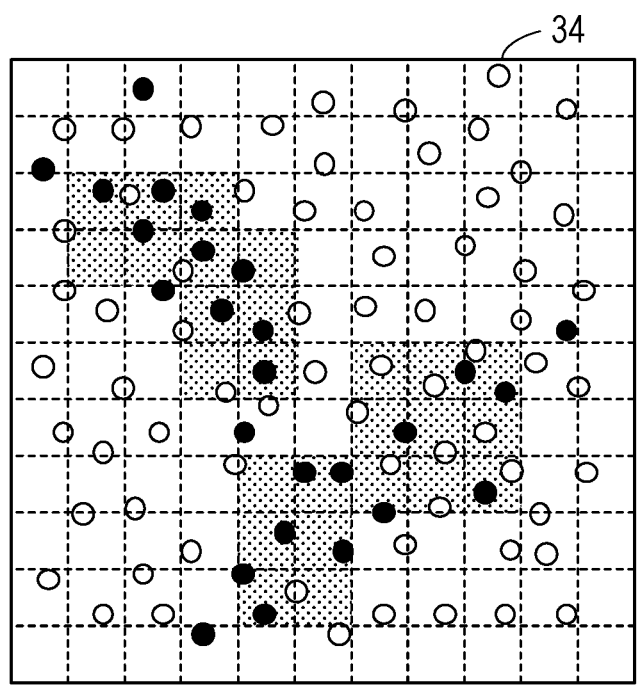

FIGS. 4A and 4B are diagrams illustrating a second extraction example of the optimal area.

A visualization screen 33 in FIG. 4A is a screen on which the distribution of spots and the optimal area on a two-dimensional plane are displayed. The visualization screen 33 illustrates an optimal area determined in accordance with the algorithm of Rajeev Rastogi and Kyuseok Shim mentioned above. The visualization screen 33 indicates a cluster in which black spots are distributed elliptically (anisotropically) around a certain position, and another cluster in which black spots are distributed elliptically away from the certain position to some extent. As illustrated in the visualization screen 33, when the distribution of black spots in each cluster is not isotropic, it is difficult to extract an optimal area that appropriately covers the black spots in the algorithm of Rajeev Rastogi and Kyuseok Shim.

A visualization screen 34 in FIG. 4B is a screen on which the distribution of spots and the optimal area on a two-dimensional plane are displayed. The visualization screen 34 illustrates the optimal area determined in accordance with the algorithm of Hiroya Inakoshi, Hiroaki Morikawa, Tatsuya Asai, Nobuhiro Yugami and Seishi Okamoto, "Discovery of Areas with Locally Maximal Confidence from Location Data", Proc. of the 19th International Conference on Database Systems for Advanced Applications (DASFAA), pp. 47-61, 21 Apr. 2014 mentioned above. The visualization screen 34 illustrates the distribution same as the visualization screen 33. As illustrated in the visualization screen 34, even when the distribution of black spots in each cluster is not isotropic, this algorithm may reduce black spots out of the optimal area.

Figure 5A:
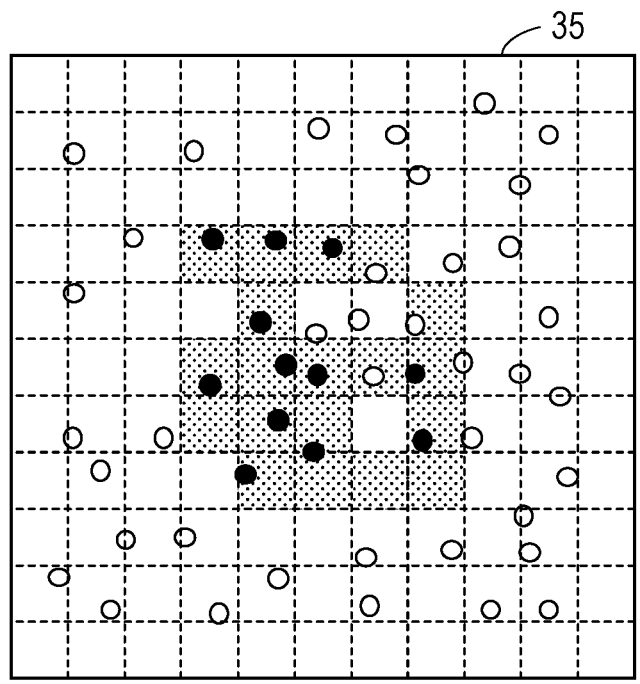
FIG. 5A is a diagram illustrating a third extraction example of an optimal area in a related art.
Figure 5B:
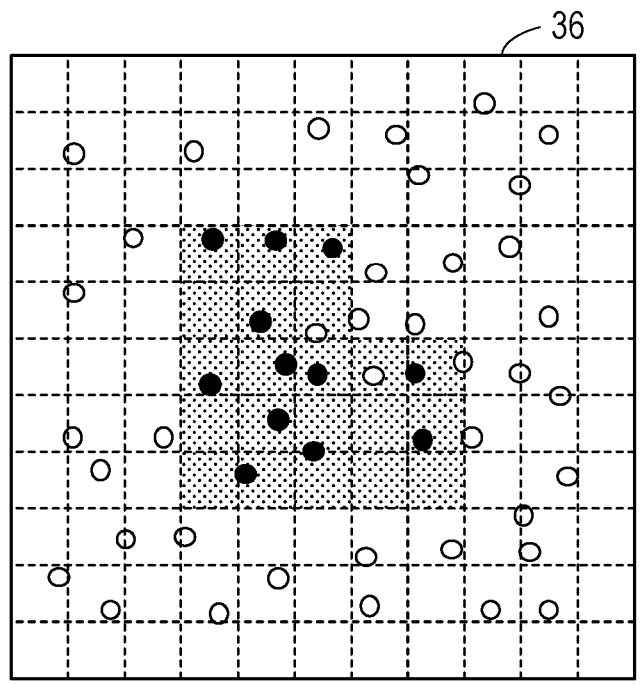
FIG. 5B is a diagram illustrating an extraction example of an optimal area in accordance with one embodiment of the invention.

FIGS. 5A and 5B are diagrams illustrating a third extraction example of the optimal area.

A visualization screen 35 in FIG. 5A is a screen on which the distribution of spots and the optimal area on a two-dimensional plane are displayed. The visualization screen 35 illustrates an optimal area determined in accordance with the same algorithm of Hiroya Inakoshi, Hiroaki Morikawa, Tatsuya Asai, Nobuhiro Yugami and Seishi Okamoto mentioned above. This algorithm allows any polygon as the shape of the optimal area. The visualization screen 35 illustrates one cluster in which black spots are distributed isotropically. However, since events corresponding to black spots occur probabilistically, the cluster does not form a circle exactly. Black spots may be placed with low probability at positions away from the center of the circle, or white spots may be placed near the center of the circle. As illustrated in the visualization screen 35, when the cluster does not form a circle correctly, the algorithm of Hiroya Inakoshi, Hiroaki Morikawa, Tatsuya Asai, Nobuhiro Yugami and Seishi Okamoto may extract an optimal area of an excessively complicated polygon with many irregularities.

In this way, when the shape of the optimal area is strictly limited in advance, such as limiting the optimal area to be extracted to a rectangle, the fitting accuracy with respect to the distribution of spots may decrease. On the other hand, when the degree of freedom of the shape is increased without limiting the shape of the optimal area, an optimal area of an excessively complicated polygon may be extracted. It may be said that the fact that the optimal area to be extracted becomes complicated corresponds to over learning in machine learning. An optimal area of an excessively complicated shape is not preferable because it may not be said that the optimal area properly expresses the feature of the distribution of a specific event. Even in the extraction of the optimal area, it is preferable that the regularization to reduce the complexity of the model be performed. Therefore, the information processing device 100 searches for the optimal area in consideration of both improvement of the fitting accuracy and reduction of the complexity of the shape.

A visualization screen 36 in FIG. 5B is a screen on which the distribution of spots and the optimal area on a two-dimensional plane are displayed. The visualization screen 36 illustrates an optimal area determined in accordance with the algorithm of a second embodiment to be described later. The visualization screen 36 illustrates the distribution same as the visualization screen 35. As illustrated in the visualization screen 36, even when the cluster does not form a circle correctly, the algorithm of the second embodiment extracts the optimal area with reduced complexity. While the optimal area of the visualization screen 35 has twenty vertices, the optimal area of the visualization screen 36 has six vertices. Next, an algorithm for extracting an optimal area using the information processing device 100 will be described.

Figure 6:
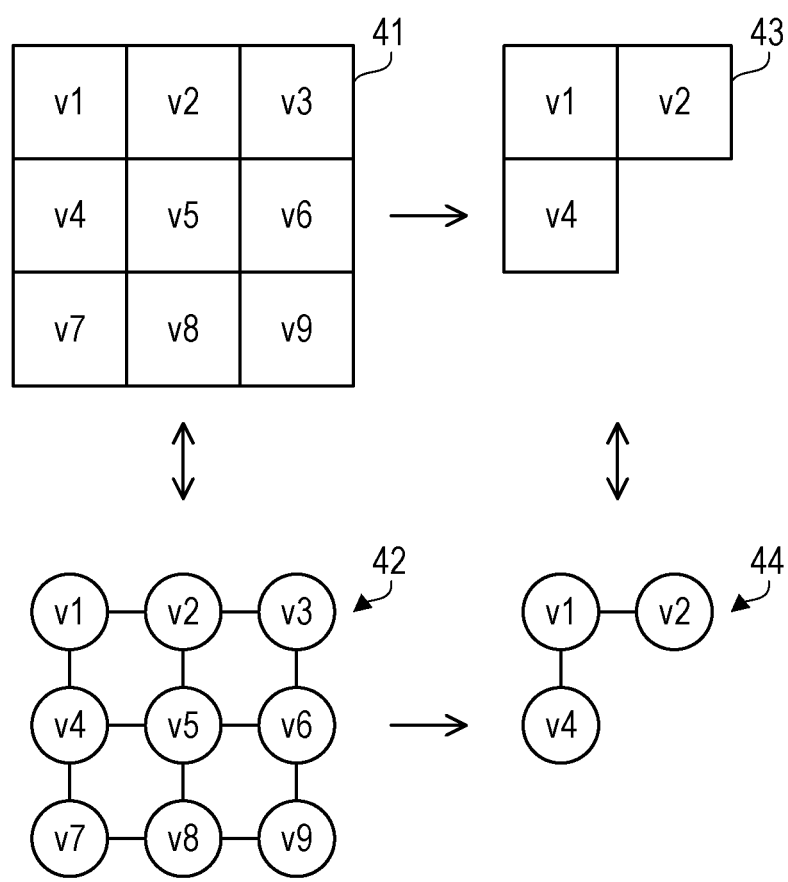
FIG. 6 is a diagram illustrating an example of a mesh and a graph.

FIG. 6 is a diagram illustrating examples of a mesh and a graph.

First, the meaning of the mesh and the graph will be explained. The two-dimensional plane which is the area to be searched is exclusively and comprehensively subdivided into divided areas called meshes. Any position on the two-dimensional plane belongs to only one of the meshes. All the meshes 41 is a set of all the meshes included in the area to be searched. Each mesh is a rectangle such as a square. The size of the mesh included in all the meshes 41 may not be uniform. For example, the information processing device 100 divides a two-dimensional plane stepwise into four pieces to generate a rectangular mesh so that the number of spots (white spot and black spot) of the reference group for each mesh is substantially uniform.

The adjacency relation of the meshes in all the meshes 41 may be expressed as an adjacency graph 42. The adjacency graph 42 includes a plurality of nodes and a plurality of edges. One node of the adjacency graph 42 corresponds to one of the meshes 41. An edge extended between one node and another node indicates that a mesh corresponding to a certain node and another mesh corresponding to another node are adjacent to each other in the meshes 41. "Adjacent to" as used herein means that the two meshes share a side. All the meshes 41 are equivalent to the adjacency graph 42 in the search for the optimal area according to the second embodiment.

When a single mesh or two or more consecutive meshes are extracted from all the meshes 41, a closed area 43 is obtained. The closed area 43 may be referred to as an adjacent closure. It is possible to reach all the other meshes from one mesh by tracing the adjacency relation in the closed area 43. There is no divided mesh or isolated mesh in the closed area 43.

The adjacency relation of the meshes in the closed area 43 may be expressed as a coupled subgraph 44. The coupled subgraph 44 is a subgraph of the adjacency graph 42 and is a coupled graph. It is possible to reach all other nodes from one node by tracing the edge in the coupled subgraph 44. There is no divided node or an isolated node in the coupled subgraph 44. One node of the coupled subgraph 44 corresponds to one mesh of the closed area 43. The closed area 43 and the coupled subgraph 44 are equivalent in the search for the optimal area.

For example, all the meshes 41 includes nine meshes composed of meshes v1 to v9. The meshes v1 to v9 are uniform squares and are arranged in a lattice pattern. The adjacency graph 42 includes nine nodes corresponding to the meshes v1 to v9, and twelve edges obtained by connecting these nine nodes in a lattice pattern. The closed area 43 includes the meshes v1, v2, and v4 selected from all the meshes 41. The mesh v1 and the mesh v2 are adjacent to each other, the mesh v1 and the mesh v4 are adjacent to each other, and the mesh v2 and the mesh v4 are not adjacent to each other. The coupled subgraph 44 includes three nodes corresponding to the meshes v1, v2, and v4 and two edges.

FIGS. 7A and 7B are diagrams illustrating an example of the relation between area extraction and penalty.

The information processing device 100 according to the second embodiment generates an objective function for evaluating selection of a mesh to be included in an optimal area, and searches for a combination of meshes at which the value of the objective function is maximized. At this time, the information processing device 100 defines a penalty for decreasing the value of the objective function as the shape of the closed area becomes complicated, and inserts the regularization term indicating the penalty into the objective function. It is conceivable to use the number of sides at which the closed area is in contact with the adjacent mesh as a regularization term.

All the meshes 51 in FIG. 7A includes ten meshes composed of the meshes v1 to v10. It is assumed that the meshes v1, v3, v5, v8, v9, and v10 are selected. In this case, the number of sides at which the closed area is in contact with the adjacent mesh is eight. The number of the sides corresponds to the number of edges cut off when separating nodes corresponding to the meshes v1, v3, v5, v8, v9, and v10 from an adjacency graph 52 corresponding to all the meshes 51.

The number of all the meshes 53 in FIG. 7B is the same as the number of all the meshes 51. It is assumed that the meshes v1, v5, v8, v9, and v10 of all the meshes 53 are selected. In this case, the number of sides at which the closed area is in contact with the adjacent mesh is nine. The number of the sides corresponds to the number of edges cut off when separating nodes corresponding to the meshes v1, v5, v8, v9, and v10 from an adjacency graph 54 corresponding to all the meshes 53.

Therefore, the penalty for selecting the meshes v1, v5, v8, v9, and v10 is larger than the penalty for selecting the meshes v1, v3, v5, v8, v9, and v10. Since the penalty has the effect of decreasing the value of the objective function, it is difficult to select the combination of the meshes v1, v5, v8, v9, and v10 as the optimal area. In this way, the complexity of the extracted optimal area may be reduced by adding a regularization term to the objective function.

A variable indicating whether each of the plurality of meshes is included in the optimal area is a vector z, and a matrix indicating the adjacency relation between the meshes is an adjacency matrix W. The length of the vector z corresponds to the mesh number. The fact that an element of vector z corresponding to a certain mesh is 0 indicates that this mesh is not included in the optimal area. The fact that an element of a vector z corresponding to a certain mesh is 1 indicates that the mesh is included in the optimal area. The adjacency matrix W is a square matrix in which the length of one side corresponds to the number of meshes. The adjacency matrix W indicates the adjacency relation as to whether two meshes share a side. The fact that the element of the adjacency matrix w corresponding to the pair of two meshes is 0 indicates that the two meshes do not share a side and are not adjacent. The fact that the element of the adjacency matrix W corresponding to the pair of two meshes is 1 indicates that the two meshes share a side and are adjacent to each other.

FIG. 8 is a diagram illustrating an example of the adjacency matrix.

An adjacency matrix 131 is the adjacency matrix W indicating the adjacency relation of the meshes v1 to v10 in all the meshes 51 and 53 in FIG. 7. It may be said that the adjacency matrix 131 indicates the connection relation of the nodes in the adjacency graphs 52 and 54 in FIG. 7. Since the adjacency relation indicating the side sharing is symmetric between the meshes, the adjacency matrix W is a symmetric matrix. In this case, the penalty that indicates the number of sides at which the closed area contacts other meshes may be calculated by the matrix product of $(1-z)^T W z$. The regularization term inserted in the objective function is defined as $-\lambda(1-z)^T W z$ so that the larger the penalty is, the smaller the value of the objective function. $\lambda$ is a predetermined coefficient.

Next, a mathematical definition of the objective function and a search method of a solution at which the objective function is maximized will be described.

First, a score function that does not include a regularization term is defined. The score function evaluates the accuracy with which a combination of selected meshes fits the distribution of black spots. The score function indicates that the larger the value of the score function is, the more accurately the combination of selected meshes accurately fits the distribution of black spots. The score function may be defined as density or certainty factor as in Equation (1).

It is assumed that n meshes composed of the meshes v1, v2, . . . , vn are included in a two-dimensional plane, and the number of hits $h_i$ and the support $s_i$ are given for mesh $v_i$ (i=1, 2, . . . , n). The number of hits $h_i$ is the number of spots (black spots) of the observation group included in the mesh $v_i$. The support $s_i$ is the number of spots (white spots and black spots) of the reference group included in the mesh $v_i$. As illustrated in Equation (2), a vector enumerating n hits corresponding to n meshes is a vector h. A vector enumerating n supports corresponding to n meshes is a vector s. A variable $x_i$ is defined for the mesh $v_i$. A vector enumerating n variable corresponding to n meshes is a vector x.

The variable $x_i$ indicates whether the mesh $v_i$ is included in the optimal area. The variable $x_i$ is defined as a sigmoid function in order to use the gradient method as illustrated in Equation (3), and takes a value between 0 and 1. The variable $z_i$ is a variable defined for the mesh $v_i$, and takes the value of the whole real number (minus infinity to plus infinity). In this way, the score function may be differentiated with respect to the variable $z_i$. Differentiating the sigmoid function of Equation (3) with the variable $z_i$ results in Equation (4).

The score function of Equation (1) calculates a value obtained by dividing the inner product of vector h and vector x by the inner product of vector s and vector x. This score function calculates a value obtained by dividing the weighted sum of the number of hits according to the value of vector x by the weighted sum of the number of supports according to the value of vector x. Therefore, it may be said that this score function evaluates the density of black spots.

$$\text{score}(x) = \text{conf}(x) \tag{1}$$
$$= \text{hit}(x)/\text{sup}(x)$$
$$= h^T x / s^T x$$
$$= (h_1 x_1 + h_2 x_2 + \ldots + h_n x_n)/(s_1 x_1 + s_2 x_2 + \ldots + s_n x_n)$$

$$h = [h_1, h_2, \ldots, h_n]^T \tag{2}$$
$$s = [s_1, s_2, \ldots, s_n]^T$$
$$x = [x_1, x_2, \ldots, x_n]^T$$

$$x_i = \sigma(z_i) = \frac{1}{1 + \exp(-z_i)} \tag{3}$$

$$\frac{d\sigma(z_i)}{dz_i} = \sigma(z_i)(1 - \sigma(z_i)) \tag{4}$$

Next, the objective function with a regularization term added to the score function is defined. This objective function comprehensively evaluates the combination of selected meshes from the viewpoint of both fitting accuracy and shape complexity of black spots. The objective function indicates that the larger the value of the objective function is, the more preferable the selected combination of meshes is. The objective function f may be defined as the sum of the score function and the regularization term as in Equation (5). The regularization term, as mentioned above, is based on the number of sides at which the closed area formed by the selected mesh is in contact with other meshes. The regularization term is defined as $-\lambda(1-x)^T W x$ using the vector x.

$$f(x) = \text{score}(x) - \lambda(1-x)^T W x \tag{5}$$
$$= h^T x / s^T x - \lambda(1-x)^T W x$$

In this way, searching for the optimal area may be replaced with an optimization problem for finding the value of the variable $z_i$ (i=1, 2, . . . , n) at which the value of the objective function f is maximized. The information processing device 100 according to the second embodiment solves this optimization problem by the gradient method.

The information processing device 100 sets an initial value $z^{(0)}$ of a vector z enumerating the variable $z_i$ (i=1, 2, . . . , N). Each element of the vector $z^{(0)}$ may be randomly selected from a range of real number or may be a predetermined value. Here, the value of the vector z at the t-th step (t=0, 1, . . . ) is expressed as $z^{(t)}$. The information processing device 100 calculates a gradient $\nabla f$ of the objective function f from the value $z^{(t)}$ of the current vector z, and updates the vector z using the product of the gradient $\nabla f$ and a predetermined coefficient $\eta$ to find $z^{(t+1)}$ as illustrated in Equation (6). The information processing device 100 repeats the calculation of the gradient of and the update of the vector z until the vector z converges.

The gradient $\nabla f$ is a vector numerating values obtained by differentiating partially the objective function f with respect to variable $z_i$ as expressed by Equation (7). From the above definition of the objective function f, the objective function f may be differentiated partially with respect to the variable $z_i$. Differentiating partially the objective function f with respect to the variable $z_i$ is equivalent to differentiating partially the objective function f with respect to the variable $x_i$, differentiating the variable $x_i$, which is a sigmoid function, with respect to the variable $z_i$, and obtaining the product of the results of the above partial differentiations. Therefore, the partial differential of the objective function f with respect to the variable $z_i$ is calculated as illustrated in Equation (8). $\omega_i$ is the i-th column vector of the adjacency matrix W.

When the vector z converges, the information processing device 100 binarizes each element of the vector z, which is a real number to convert the vector z to a bit vector. The information processing device 100 converts $z_i=1$ when $z_i>0$, and converts $z_i=0$ when $z_i\leq 0$. A vector z as a bit vector indicates an optimal area. $z_i=1$ indicates that the mesh $v_i$ is included in the optimal area. $z_i=0$ indicates that the mesh $v_i$ is not included in the optimal area.

$$z^{(t+1)} = z^{(t)} - \eta \nabla f(x) \tag{6}$$

$$\nabla f(x) = [\partial f(x)/\partial z_1, \partial f(x)/\partial z_2, \ldots, \partial f(x)/\partial z_n]^T \tag{7}$$

$$\frac{\partial f(x)}{\partial z_i} = \frac{\partial x_i}{\partial z_i} \frac{\partial f(x)}{\partial x_i} \tag{8}$$
$$= x_i(1-x_i)(h^T x/s^T x(s_i/s^T x - h_i/h^T x) + \lambda(2Wx - \omega_i))$$

Equation (1) indicates a score function for calculating the certainty factor. The score function used in Equation (5) may be differentiable, and other score functions may also be used. For example, as illustrated in Equation (9) the equation obtained by inverting the sign of the log-likelihood ratio may be used as the score function. As illustrated in Equation (10) the equation obtained by inverting the sign of the Bichromatic Discrepancy may be used as the score function. $m_R$ and $b_R$ in Equations (9) and (10) are defined as in Equation (11). "1" is an n-dimensional column vector in which all elements are 1. $\alpha$, $\beta$, $\gamma$ in Equation (10) are predetermined coefficients. The higher the accuracy of the fitting of the optimal area to the distribution of black spots is, the smaller the log-likelihood ratio and the dissimilarity are, so that the equation obtained by inverting the sign is used as the objective function f.

$$\text{score}(x) = -\text{likehood}(x) \tag{9}$$
$$-\{m_R \log(m_R/b_R) + (1-m_R)\log((1-m_R)/(1-b_R))\}$$

$$\text{score}(x) = -\text{descrepancy}(x) \tag{10}$$
$$-\{am_R + \beta b_R + \gamma\}$$

$$m_R = h^T x/h^T 1, \tag{11}$$
$$b_R = s^T x/s^T 1$$

Although the regularization term is defined as $-\lambda(1-x)^T Wx$ in the above equation (5), a regularization term that makes it possible to calculate the penalty more accurately than Equation (5) is conceivable from the viewpoint of counting the number of sides at which the closed area is in contact with other meshes. Hereinafter, examples of other regularization terms will be described. First, an example of all the meshes used for explanation of another regularization term will be described, and then adjacency matrixes W, U and Q used for another regularization term will be described.

FIG. 9 is a diagram illustrating an example of another mesh.

All the meshes 61 includes thirteen meshes composed of meshes v0 to v12. The mesh v0 is a large square arranged in the center, and the meshes v1 to v12 are small squares arranged around the mesh v0. The right side of the mesh v0 is in contact with the left side of the meshes v2 and v3. The lower side of the mesh v0 is in contact with the upper side of the meshes v5 and v6. The left side of the mesh v0 is in contact with the right side of the meshes v8 and v9. The upper side of the mesh v0 is in contact with the lower side of the meshes v11 and v12. The mesh v0 and the meshes v1, v4, v7, and v10 do not share sides. However, the upper right vertex of the mesh v0 is in contact with the lower left vertex of the mesh v1. The lower right vertex of the mesh v0 is in contact with the upper left vertex of the mesh v4. The lower left vertex of the mesh v0 is in contact with the upper right vertex of the mesh v7. The upper left vertex of the mesh v0 is in contact with the lower right vertex of the mesh v10. In the following, a case where the information processing device 100 selects the mesh v0 as the closed area and does not select the meshes v1 to v12 will be described.

FIG. 10 is a diagram illustrating an example of other adjacency matrixes.

The information processing device 100 generates the adjacency matrixes W, U and Q from all the meshes. An adjacency matrix 132 is the adjacency matrix W illustrating the adjacency relation in which one mesh shares a side with another mesh as described above. The adjacency matrix W is a symmetric matrix. The fact that the element of the adjacency matrix w corresponding to the two meshes is 1, indicates that the two meshes share a side. The fact that the element of the adjacency matrix w corresponding to the two meshes is 0 indicates that the two meshes do not share a side. In all the meshes 61 of FIG. 9, the mesh v0 has an adjacency relation of the adjacency matrix W with the meshes v2, v3, v5, v6, v8, v9, v11, and v12.

An adjacency matrix 133 is an adjacency matrix U indicating the adjacency relation in which the vertex of one mesh is in contact with the vertex of another mesh or, the vertex of one mesh is in contact with the middle of a side of another mesh (a position other than the vertex). However, the vertex which is the end point of the sharing side when two meshes share a side is excluded from the adjacency relation of the adjacency matrix U. The adjacency matrix U may not be a symmetric matrix. The element of the adjacency matrix U indicates the number of vertices corresponding to the above and are integers not less than 0. The fact that the element of the adjacency matrix U corresponding to one mesh and another mesh indicates 1 or more, indicates that the certain mesh has one or more vertices that satisfy the above conditions with the another mesh. The fact that the element of the adjacency matrix U corresponding to one mesh and another mesh indicates 0, indicates that the certain mesh has no vertices that satisfy the above conditions with the another mesh.

In all the meshes 61 of FIG. 9, the mesh v0 has an adjacency relation of the adjacency matrix U with the meshes v1, v4, v7, and v10. The mesh v0 shares sides with the meshes v2, v3, v5, v6, v8, v9, v11, and v12, and has no adjacency relation of the adjacency matrix U with these meshes. The mesh v1 has an adjacency relation of the adjacency matrix U with the mesh v0. The mesh v1 shares sides with meshes v2 and v12, and there is no adjacency relation of the adjacency matrix U with these meshes. The mesh v2 has an adjacency relation of the adjacency matrix U with the meshes v0 and v12. The mesh v2 has an adjacency relation of the adjacency matrix U with mesh v0. This is because the lower left vertex of the mesh v2, which is located in the middle of the right side of the mesh v0, is not the vertex for mesh v0.

Similarly to the above, the mesh v3 has an adjacency relation of the adjacency matrix U with the meshes v0 and v5. The mesh v4 has an adjacency relation of the adjacency matrix U with the mesh v0. The mesh v5 has an adjacency relation of the adjacency matrix U with the meshes v0 and v3. The mesh v6 has an adjacency relation of the adjacency matrix U with the meshes v0 and v8. The mesh v7 has an adjacency relation of the adjacency matrix U with the mesh v0.

The mesh v8 has an adjacency relation of the adjacency matrix U with the meshes v0 and v6. The mesh v9 has an adjacency relation of the adjacency matrix U with the meshes v0 and v11. The mesh v10 has an adjacency relation of the adjacency matrix U with the mesh v0. The mesh v11 has an adjacency relation of the adjacency matrix U with the meshes v0 and v9. The mesh v12 has an adjacency relation of the adjacency matrix U with the meshes v0 and v2.

An adjacency matrix 134 is an adjacency matrix Q indicating the adjacency relation where the vertex of one mesh is in contact with the vertex of another mesh. However, the vertex which is the end point of the sharing side when two meshes share a side is excluded from the adjacency relation of the adjacency matrix Q. The set of nonzero elements in the adjacency matrix Q is a subset of the set of nonzero elements of the adjacency matrix U. The adjacency matrix Q is a symmetric matrix. In all the meshes 61 of FIG. 9, there is an adjacency relation of the adjacency matrix Q between the mesh v0 and each of the meshes v1, v4, v7, and v10. There is an adjacency relation of adjacency matrix Q between the mesh v2 and the mesh v12, between the mesh v3 and the mesh v5, between the mesh v6 and the mesh v8, and between the mesh v9 and the mesh v11.

The number of sides at which the closed area is in contact with the surrounding mesh may be calculated as follows. (1) The number of connections by the adjacency matrix W from the mesh (outside mesh) outside the closed area to the mesh (inside mesh) in the closed area is $w=x^T W(1-x)$. (2) The number of connections by the adjacency matrix U from the inside mesh to the outside mesh is $u=(1-x)^T Ux$. (3) The number of connections by the adjacency matrix Q from the inside mesh to another inside mesh is $q=x^T Qx$. The number of sides at which the closed area is in contact with the surrounding meshes is $2w-u-q$, and may be calculated as illustrated in Equation (12). Equations (1), (9), (10), and so forth may be used for the score function of Equation (12).

The idea behind Equation (12) is as follows. In all the meshes 61 of FIG. 9, w is calculated as w=8 where the mesh v0 has four sides. In order to correct this, focusing on the fact that the number of vertices and the number of sides coincide with each other in the polygon, the number of vertices is counted. At this time, one of the adjacencies from the mesh v0 to the mesh v2 and the adjacency from the mesh v0 to the mesh v3 by the adjacency matrix W is offset using two of the adjacencies from the mesh v2 to the mesh v0 and the adjacency from the mesh v3 to the mesh v0 by the adjacency matrix U. This corresponds to 2w−u. For all the meshes 61, 2w−u=4, which is equal to the number of sides.

However, 2w−u may become larger than the actual number of sides due to the adjacency between the inside meshes for a complicated closed area having a cavity inside the closed area. Therefore, the value obtained by deleting the adjacency between the inside meshes is 2w−u−q.

$$f(x) = \text{score}(x) - \lambda\{2x^T W(1-x) - (1-x)^T Ux - x^T Qx\} \quad (12)$$
$$= \text{score}(x) - \lambda\{(1-x)^T (2W-U)x - x^T Qx\}$$

Next, a method of determining the adjacency relation of the adjacency matrixes W, U and Q will be described. It is assumed that the lower left of the two-dimensional plane is the origin, the right direction from the origin is the x axis and the upward direction from the origin is the y axis. After subdividing the two-dimensional plane into meshes, the information processing device 100 scan the two-dimensional plane with the X coordinate as the first sort key and the Y coordinate as the second sort key. For example, the information processing device 100 scans the positions on the two-dimensional plane in the horizontal direction in ascending order of the X coordinate, and scans the positions with the same X coordinate in the vertical direction in ascending order of Y coordinate. The information processing device 100 repeats the process of scanning from the bottom to the top, moving to the right, scanning from the bottom to the top, and moving to the right. When the lower left vertex of a certain mesh is detected, the information processing device 100 activates the mesh. When the upper right vertex of a certain mesh is detected, the information processing device 100 deactivates the mesh. Meshes that are being activated may be compared in the determination of the adjacency relation.

In the adjacency relation of the adjacency matrix W, the coordinates of the lower left of the mesh v1 are (lx1, ly1), the coordinates of the upper right of the mesh v1 are (ux1, uy1), the coordinates of the lower left of the mesh v2 are (lx2, ly2), and the coordinates of the upper right of the mesh v2 are (ux2, uy2). When the condition of the formula (13) is satisfied, the mesh v2 has the adjacency relation of the adjacency matrix W with the mesh v1. However, it is also required to satisfy the condition of Equation (14) in order to exclude the case where the vertex is shared.

$$(lx2-ux1<1) \& (lx1-ux2<1) \& (ly2-uy1<1) \& (ly1-uy2<1) \quad (13)$$

$$dx+dy = \max(lx2-ux1, lx1-ux2) + \max(ly2-uy1, ly1-uy2) < 0 \quad (14)$$

In the adjacency relation of the adjacency matrix U, the coordinates of the lower left of the mesh v1 are (lx1, ly1), and the coordinates of the upper right of the mesh v1 are (ux1, uy1). The coordinates of any vertex of mesh v2 are (x2, y2). When the condition of Equation (15) is satisfied, the mesh v2 has the adjacency relation of the adjacency matrix U with the mesh v1. Even when the condition of Equation (16) is satisfied, the mesh v2 has the adjacency relation of the adjacency matrix U with the mesh v1.

$$((x2=ux1) \& (ly1<y2<uy1))$$

$$\text{or } ((y2=uy1) \& (lx1<x2<ux1))$$

$$\text{or } ((y2=ly1) \& (lx1<x2<ux1))$$

$$\text{or } ((x2=lx1) \& (ly1<y2<uy1)) \quad (15)$$

$$\max(x2-ux1, lx1-x2) + \max(y2-uy1, ly1-y2) = 0 \quad (16)$$

In the adjacency relation of the adjacency matrix Q, the coordinates of the lower left of the mesh v1 are (lx1, ly1), the coordinates of the upper right of the mesh v1 are (ux1, uy1), the coordinates of the lower left of the mesh v2 are (lx2, ly2), and the coordinates of the upper right of the mesh v2 are (ux2, uy2). When the condition of Equation (17) is satisfied, the mesh v2 has the adjacency relation of the adjacency matrix Q with the mesh v1.

$$(\max(lx2-ux1, lx1-ux2)=0)$$

$$\&(\max(ly2-uy1, ly1-uy2)=0) \qquad (17)$$

Next, functions and processing procedures of the information processing device 100 will be described.

Figure 11:
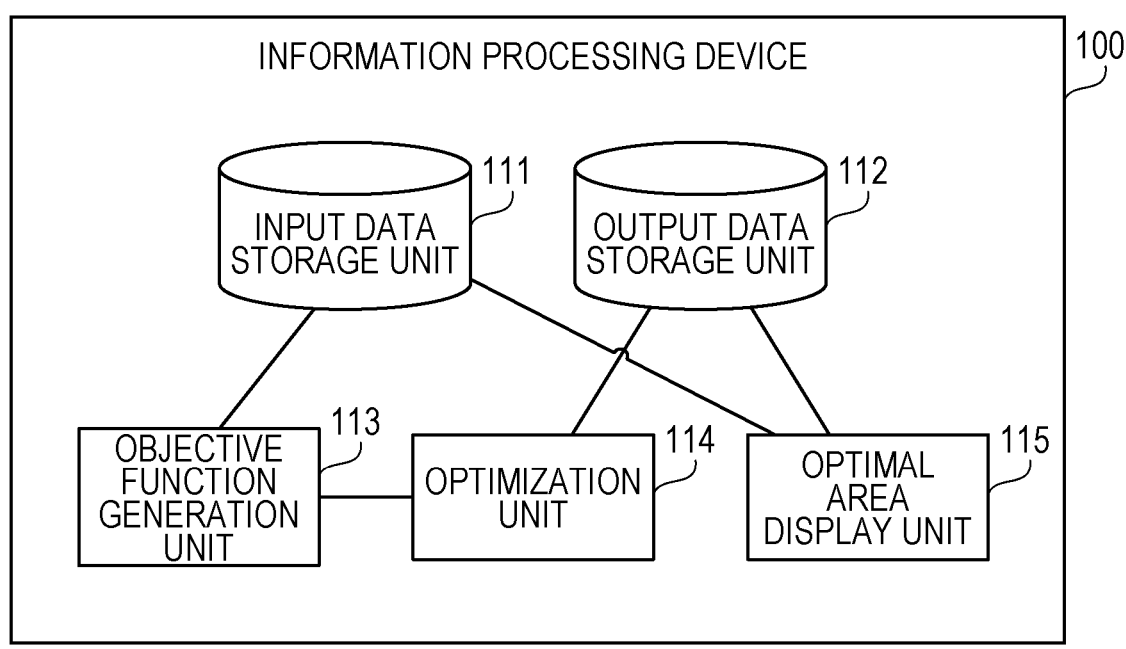
FIG. 11 is a block diagram illustrating a function example of an information processing device.

FIG. 11 is a block diagram illustrating a functional example of the information processing device.

The information processing device 100 includes an input data storage unit 111, an output data storage unit 112, an objective function generation unit 113, an optimization unit 114, and an optimal area display unit 115. The input data storage unit 111 and the output data storage unit 112 are implemented by using, for example, the RAM 102 or the HDD 103. The objective function generation unit 113, the optimization unit 114, and the optimal area display unit 115 are implemented by using, for example, a program executed by the CPU 101.

The input data storage unit 111 stores input data used for searching for the optimal area. The input data includes area data indicating the division result of the mesh, and distribution data indicating the support and the number of hits for each mesh. The dividing process of dividing the two-dimensional plane into a plurality of meshes may be performed by the information processing device 100 or by another device. The support and the number of hits for each mesh may be counted by the information processing device 100 or by another device.

The output data storage unit 112 stores output data indicating the determined optimal area. The output data corresponds to the above binarized vector z.

The objective function generation unit 113 generates an objective function including a score function and a regularization term. The objective function generation unit 113 allocates variables to the respective meshes indicated by the area data to generate a score function from distribution data and variables. The objective function generation unit 113 generates an adjacency matrix indicating the adjacency relation between the meshes from the area data to generate a regularization term from variables and the adjacency matrix. The objective function is obtained by adding a regularization term to the score function.

The optimization unit 114 performs the optimization process by the gradient method on the objective function generated by the objective function generation unit 113 to search for the value of the variable at which the value of the objective function is maximized. The optimization unit 114 determines whether each mesh is included in the optimal area from the solution calculated by the gradient method, and stores the output data in the output data storage unit 112.

The optimal area display unit 115 displays a visualization screen such as the aforementioned visualization screen 36 on the display 104a. The distribution of spots (black spots) belonging to the observation group and other spots (white spots) is displayed on the two-dimensional plane of the visualization screen. A polygon indicating the outer frame of the determined optimal area is displayed in superposition with the distribution of points on the two-dimensional plane of the visualization screen. The information processing device 100 may transmit the output data or the visualization result to another device via the network 107a or may output it to another type of output device such as a printer.

Figure 12:
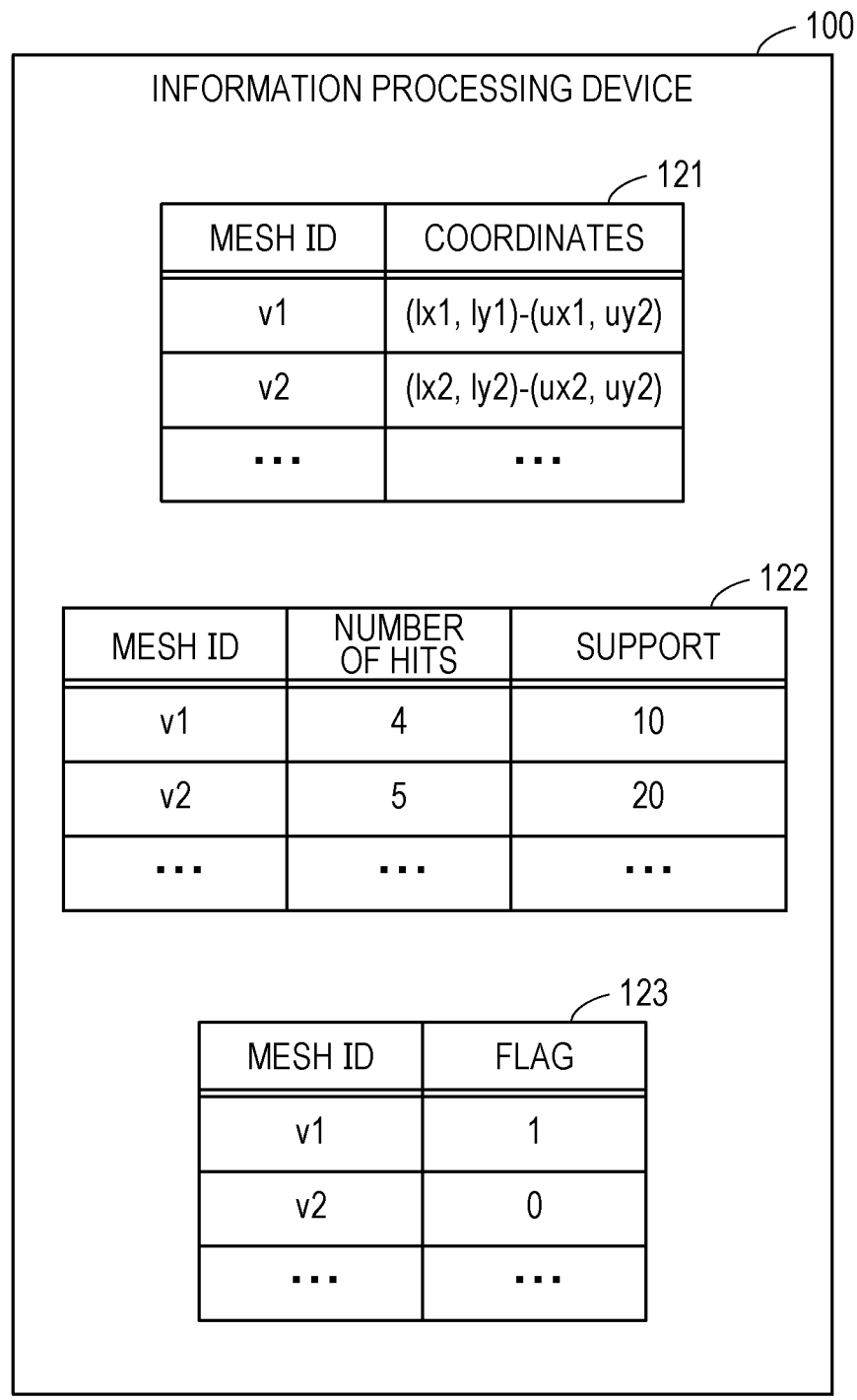
FIG. 12 is a diagram illustrating an example of input data and output data.

FIG. 12 is a diagram illustrating an example of input data and output data.

The input data storage unit 111 stores area data 121 and distribution data 122. The area data 121 includes a plurality of records. Each record of the area data 121 includes a mesh ID and coordinates. The mesh ID is an identifier for identifying the mesh. The coordinates indicate the position of the mesh in the two-dimensional plane. For example, the coordinates of the lower left vertex of the mesh and the coordinates of the upper right vertex are registered as coordinates. The adjacency relation between the meshes (adjacency relation corresponding to the adjacency matrix W, and so forth) may be registered in advance in the area data 121.

Distribution data 122 includes a plurality of records. Each record of the distribution data 122 includes a mesh ID, the number of hits and a support. The mesh ID is an identifier for identifying the mesh. The number of hits is the number of spots (black spots) of the observation group included in the mesh. The support is the number of spots (black spots and white spots) of the reference group included in the mesh.

The output data storage unit 112 stores optimal area data 123.

The optimal area data 123 includes a plurality of records. Each record of the optimal area data 123 includes a mesh ID and a flag. The mesh ID is an identifier for identifying the mesh. The flag indicates whether the mesh is included in the optimal area. A mesh whose flag is 1 is included in the optimal area, and a mesh whose flag is 0 is not included in the optimal area.

Figure 13:
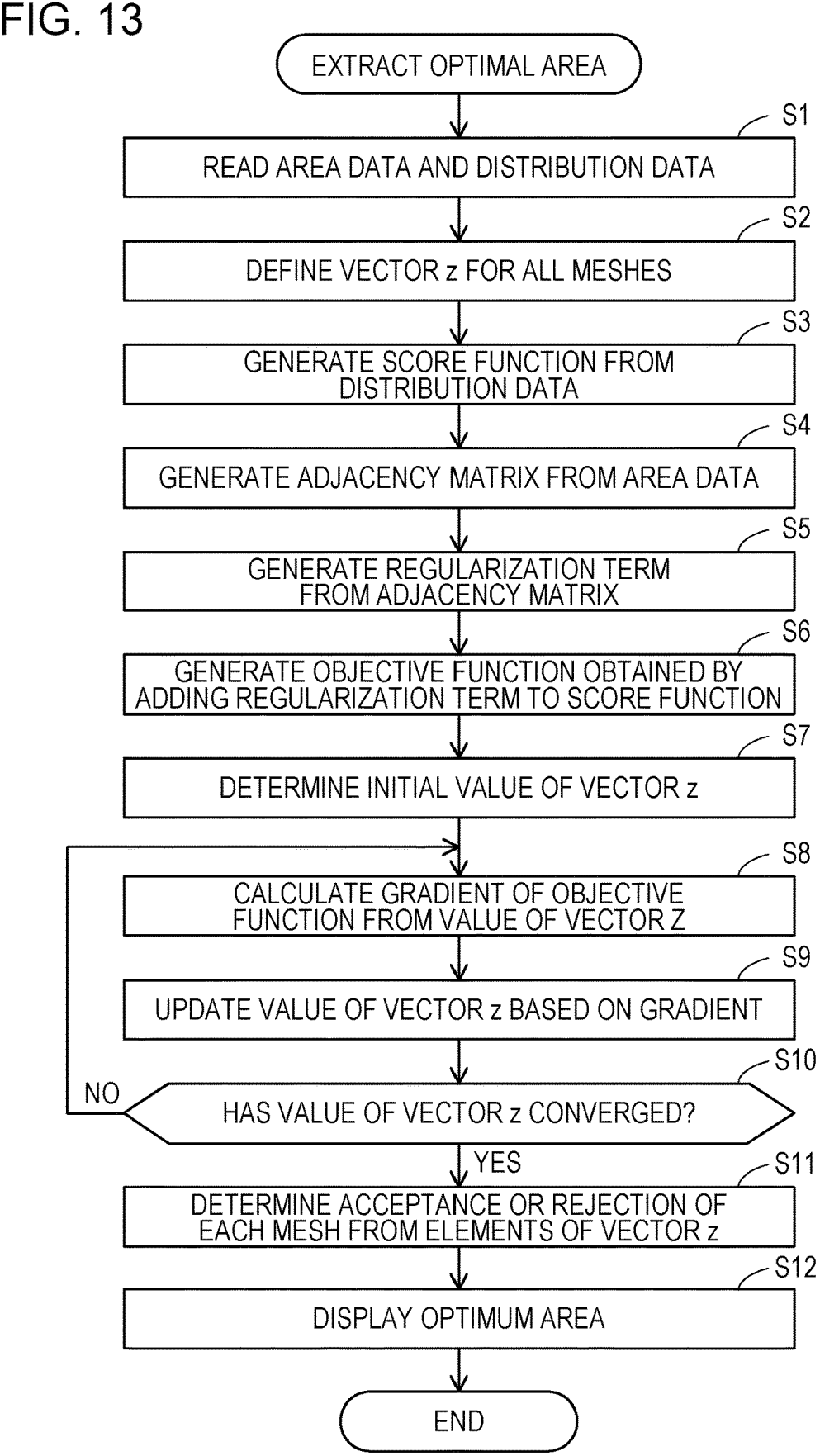
FIG. 13 is a flowchart illustrating a procedure example of optimal area extraction.

FIG. 13 is a flowchart illustrating a procedure example of optimal area extraction.

(S1) The objective function generation unit 113 reads the area data 121 and the distribution data 122.

(S2) The objective function generation unit 113 allocates the variable $z_i$ to the mesh $v_i$ (i=1, 2, ..., N) indicated by the area data 121 and defines the vector z enumerating the variable $z_i$.

(S3) The objective function generation unit 113 Generate a score function such as Equation (1), Equation (9) or Equation (10) using the number of hits and the support of each mesh included in the distribution data 122, and the vector z defined in step S2.

(S4) The objective function generation unit 113 generates an adjacency matrix from the area data 121. For example, the objective function generation unit 113 generates the adjacency matrix W indicating a connection between sides. Alternatively, the objective function generation unit 113 generates the adjacency matrix W indicating a connection between sides, the adjacency matrix U indicating a connection between vertices and a connection between a vertex and a side, and the adjacency matrix Q indicating a connection between vertices.

(S5) the objective function generation unit 113 generates a regularization term indicating a penalty of the shape of the optimal area using the adjacency matrix generated in step S4 and the vector z defined in step S2. For example, the objective function generation unit 113 generates a regularization term using the adjacency matrix W. Alternatively, the objective function generation unit 113 generates a regularization term using the adjacency matrixes W, U and Q.

(S6) The objective function generation unit 113 generates an objective function obtained by adding the regularization term of the step S5 to the score function of the step S3. For example, the objective function generation unit 113 generates an objective function such as Equation (5) or Equation (12).

(S7) The optimization unit 114 determines the initial value of the vector z. During the search for the optimal area, each element of the vector z may take any real number. The optimization unit 114 may randomly determine the initial value of the vector z or may determine a predetermined real number.

(S8) As illustrated in Equation (7) and Equation (8), the optimization unit 114 calculates, from the value of the current vector z, the gradient of the objective function of step S6.

(S9) As illustrated in Expression (6), the optimization unit 114 updates the value of the current vector z using the gradient calculated in step S8. For example, the optimization unit 114 multiplies the gradient by a predetermined weight ($-\eta$) and adds the multiplied gradient to the value of the current vector z.

(S10) The optimization unit 114 determines whether the value of the vector z has converged. For example, when the difference between the magnitude (absolute value) of the vector z after updated in step S9 and the magnitude (absolute value) of the vector z before updated is less than the threshold value, the optimization unit 114 determines that the value of the vector z has converged. Alternatively, when the distance (norm) between the magnitude (absolute value) of the vector z after updated in step S9 and the magnitude (absolute value) of the vector z before updated is less than the threshold value, the optimization unit 114 determines that the value of the vector z has converged. When the vector z has converged, the process proceeds to step S11, and when the vector z has not converged, the process proceeds to step S8.

(S11) The optimization unit 114 determines adoption/non-adoption of each mesh (whether to adopt the mesh as the optimized area) from the value of the variable $z_i$ which is an element of the vector z. For example, when the value of the variable $z_i$ before binarization is larger than 0, the optimization unit 114 determines that the mesh $v_i$ is adopted as the optimized area and when the value of the variable $z_i$ before binarization is 0 or less, the optimization unit 114 determines that the mesh $v_i$ is not adopted as the optimized area. The optimization unit 114 generates and outputs the optimal area data 123.

(S12) The optimal area display unit 115 displays a visualization screen visualizing the optimal area based on the area data 121, the distribution data 122 and the optimal area data 123 to display the generated visualization screen on the display 104a. A distribution of spots, a polygon of an outer frame of the optimal area, and so forth in the two-dimensional plane are displayed on the visualization screen.

According to the information processing device 100 of the second embodiment, one or more closed areas with dense spots are extracted as the optimal area from the two-dimensional plane in which black spots and white spots are distributed unevenly, and are visualized. Therefore, it is easy to analyze the generation status of events such as spatial epidemiology and traffic analysis. Selection of the closed area is evaluated using the objective function. Therefore, it is not required to strictly limit the shape and size of the optimal area to be extracted in advance, the closed area may be flexibly set according to the distribution of the black spot and the white spot, and the fitting accuracy improves. The regularization term using the adjacency matrix is added to the objective function. Therefore, the fitting accuracy and the complexity of the closed area are comprehensively evaluated. For this reason, it is possible to suppress the excessively complicated shape of the optimal area to be extracted, and it is possible to extract w optimal area having a natural shape that properly expresses the generation status of the event. An optimal solution of the objective function is retrieved by the gradient method. Therefore, it is not required to comprehensively evaluate combinations of various closed areas, whereby it is possible to reduce the amount of calculation.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable storage medium storing a program that causes a processor to execute a process, the process comprising:
    acquiring distribution data indicating a distribution of spots in a geographically-related region to be searched, and area data indicating positions of a plurality of divided areas obtained by dividing the region to be searched;
    generating an adjacency matrix indicating an adjacency relation between the plurality of divided areas from the area data;
    generating an evaluation function for evaluating selection of two or more of the plurality of divided areas using:
    a) a variable indicating selection of two or more consecutive divided areas, b) the distribution data, and c) the adjacency matrix;
    calculating a gradient of a value of the evaluation function from a current value of the variable;
    executing a gradient method search for updating the value of the variable using the calculated gradient; and
    determining selection of the two or more divided areas as an optimal area for event occurrence analysis based on a result of the gradient method search.

2. The non-transitory computer-readable storage medium according to claim 1,
    wherein the evaluation function includes a first evaluation item for evaluating a fitting of the two or more divided areas with respect to the distribution of the spots using the variable and the distribution data, and a second evaluation item for evaluating a shape of the two or more divided areas using the variable and the adjacency matrix.

3. The non-transitory computer-readable storage medium according to claim 2,
    wherein the second evaluation item is set so that the smaller the number of sides at which the two or more divided areas are in contact with another one of the plurality of divided areas is, the higher the shape of the two or more divided areas is evaluated.

4. The non-transitory computer-readable storage medium according to claim 2,
    wherein the gradient method search includes searching for a value of the variable at which an evaluation value obtained by combining an evaluation based on the first evaluation item with an evaluation based on the second evaluation item is maximized.

5. The non-transitory computer-readable storage medium according to claim 1,
wherein the adjacency matrix includes a first adjacency matrix indicating a sharing relation of a side between the plurality of divided areas, and a second adjacency matrix indicating a sharing relation of a vertex between the plurality of divided areas.

6. The non-transitory computer-readable storage medium according to claim 1,
wherein the area to be searched is an area that exists on a map.

7. The non-transitory computer-readable storage medium according to claim 1,
wherein the spots indicate locations of events.

8. A device comprising:
a memory for storing distribution data indicating a distribution of spots in a geographically-related region to be searched, and area data indicating positions of a plurality of divided areas obtained by dividing the region to be searched; and
a processor configured to,
generate an adjacency matrix indicating an adjacency relation between the plurality of divided areas from the area data,
generate an evaluation function for evaluating selection of two or more of the plurality of divided areas using at least one of: a) the variable indicating selection of two or more consecutive divided areas, b) the distribution data, and c) the adjacency matrix among the area to be searched,
calculate a gradient of a value of the evaluation function from a current value of the variable,
execute a gradient method search for updating the value of the variable using the calculated gradient, and
determine selection of the two or more divided areas as an optimal area for event occurrence analysis based on a result of the gradient method search.

9. The device according to claim 8,
wherein the spots indicate locations of events.

10. A method for identifying an optimal area of event occurrence, comprising:
acquiring distribution data indicating a distribution of occurrences of interest in a geographically-related region to be searched, and area data indicating positions of a plurality of divided areas obtained by dividing the region to be searched;
determining an adjacency relation between the plurality of divided areas from the area data;
generating an evaluation function for evaluating selection of two or more of the plurality of divided areas using: a) a variable indicating selection of two or more consecutive divided areas, b) the distribution data, and c) the adjacency matrix;
calculating a gradient of a value of the evaluation function from a current value of the variable;
executing a gradient method search for updating the value of the variable using the calculated gradient; and
determining selection of the two or more divided areas as an optimal area for examining the occurrences of interest based on a result of the gradient method search.

* * * * *